United States Patent
Agarwal

(10) Patent No.: US 11,820,942 B2
(45) Date of Patent: Nov. 21, 2023

(54) COATED PROPPANTS

(71) Applicant: Dow Global Technologies LLC, Midland, MI (US)

(72) Inventor: Praveen Agarwal, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 10 days.

(21) Appl. No.: 17/630,811

(22) PCT Filed: Jan. 22, 2020

(86) PCT No.: PCT/US2020/014508
§ 371 (c)(1),
(2) Date: Jan. 27, 2022

(87) PCT Pub. No.: WO2021/021242
PCT Pub. Date: Feb. 4, 2021

(65) Prior Publication Data
US 2022/0275271 A1    Sep. 1, 2022

Related U.S. Application Data

(60) Provisional application No. 62/881,149, filed on Jul. 31, 2019.

(51) Int. Cl.
*C09K 8/80*    (2006.01)
*C09K 8/62*    (2006.01)
*E21B 43/267*    (2006.01)

(52) U.S. Cl.
CPC ............... *C09K 8/805* (2013.01); *C09K 8/62* (2013.01); *E21B 43/267* (2013.01)

(58) Field of Classification Search
CPC . C09K 8/805; C09K 8/68; C09K 8/88; C09K 8/62; C09K 8/685; C09K 8/80; E21B 43/267
See application file for complete search history.

(56) References Cited

U.S. PATENT DOCUMENTS

| | | |
|---|---|---|
| 2,076,188 A | 4/1955 | Fitko |
| 3,674,717 A | 7/1972 | Fuzesi |
| 4,088,600 A | 5/1978 | Tutein |
| 5,169,562 A | 12/1992 | Mitchell |
| 9,714,378 B2 | 7/2017 | Kumar |
| 9,725,645 B2 | 8/2017 | Monastiroitis |
| 9,896,620 B2 | 2/2018 | Zielinski |
| 10,053,849 B2 | 10/2018 | Windebank |
| 2015/0119301 A1 | 4/2015 | McDaniel |
| 2016/0186049 A1 | 6/2016 | Bothwell |
| 2017/0313931 A1 | 11/2017 | Chopade |
| 2018/0105735 A1* | 4/2018 | Yang ............. E21B 43/267 |
| 2018/0215996 A1 | 8/2018 | Maxey |

FOREIGN PATENT DOCUMENTS

| | | | |
|---|---|---|---|
| CA | 3039468 A1 * | 4/2018 | ............. C09K 8/685 |
| WO | 2013/158306 A | 10/2013 | |
| WO | 2016/160425 A | 10/2016 | |
| WO | 2016/183322 A | 11/2016 | |
| WO | 2017/003813 A | 1/2017 | |

* cited by examiner

*Primary Examiner* — Zakiya W Bates

(57) ABSTRACT

Coated proppant particles are prepared by coating the particles with a coating composition that includes at least one polyisocyanate and at least one ingredient selected from i) an isocyanate trimerization catalyst, ii) a carbodiimide catalyst, iii) an alcohol, iv) a polyamine and v) an alkanolamine, and curing the coating composition. Starch is present during at least part of the curing step, such that the starch becomes embedded in at least a portion of the cured coating. The coating composition cures rapidly at moderate temperatures, and bonds to itself well under conditions of heat and pressure as are experienced by the particles in subterranean formations.

9 Claims, No Drawings

COATED PROPPANTS

This invention relates to proppants and methods of making proppants.

Oil and natural gas are obtained by drilling into subterranean reservoirs. Often, the oil and gas products are trapped within a formation that has low porosity and low permeability and cannot be extracted easily. These formations are often hydraulically fractured by pumping fluids at high pressure and velocity into the formation. Trapped oil and gas are released from the fractured formation. The fracturing also forms flow channels through which those products can travel into the well bore, from which they can be extracted.

Because of high localized pressures, those fractures and fissures tend to close when the fracturing step is completed. This shuts off the flow channels, reducing or eliminating the flow of product to the well bore. To avoid this problem, proppants often are injected into the well along with the hydraulic fracturing fluid. The proppants are solid materials that occupy space in the fractures and thus prevent them from becoming closed off. The proppants are in the form of small particles. Sand is widely used because it is readily available, inexpensive, and has a suitable particle size. Even though the proppant particles occupy space within the fractures, there is room in spaces between them for the oil and gas products to flow.

The flow of oil and gas can wash the proppant out of the formation and back into the well, a phenomenon known as "proppant flowback". This is undesirable because the fractures partially or entirely close once the proppant is washed away, leading to decreased production rates and downtime. The proppant needs to be separated from the product, as well. The proppants, especially silica sand, are abrasive and can damage submersible pumps and other equipment if they are washed back to the wellbore.

A common way to reduce proppant flowback is by applying a polymeric coating to the particles. At the temperature and pressure conditions in the well, the polymer coating causes the particles to stick together and also to the underlying rock formation. This makes the particles more resistant to being washed out of the fractures without rendering the formation containing the bonded proppant particles unduly impermeable to the flow of oil and gas out of the well.

Among the polymers that have been used are phenolic resins, various epoxy resins, and isocyanate-based polymers that have urethane, urea, carbodiimide, isocyanurate and like linkages. Polymer-coated proppants of this type are described, for example, in WO 2017/003813, US Published Patent Application Nos. 2008-0072941 and 2016-0186049 and U.S. Pat. Nos. 9,725,645, 9,896,620 and 9,714,378.

While good performance has been obtained in some cases, there is a desire to further improve flowback resistance. The proppant particles should be free-flowing rather than agglomerated, so the particles can be carried into the formulation with the fracturing fluid. Once in place, the coated particles need to bond under the local heat and pressure conditions to reduce or eliminate proppant flowback.

This invention is a method for forming a coated proppant. The method comprises applying a coating composition to the surface of solid substrate particles, wherein the solid substrate particles are thermally stable to a temperature of at least 150° C., wherein the coating composition comprises at least one polyisocyanate and at least one additional ingredient selected from i) an isocyanate trimerization catalyst, ii) a carbodiimide catalyst, iii) an alcohol, iv) a polyamine and v) an alkanolamine and curing the coating composition at an elevated temperature of up to 150° C. and for a period of up to 10 minutes on the surface of the substrate particles to form the solid polymeric coating at the surface of the solid substrate particles, wherein starch is present during at least a portion of said curing step, such that the starch becomes incorporated into the solid polymeric coating.

The invention is also a coated proppant particle that can be made using the method. In particular embodiments, the invention is a coated proppant particle comprising a substrate particle having a polymeric coating that weighs 0.1 to 10 weight percent of the weight of the substrate particle, wherein the polymeric coating contains one or more of isocyanurate, carbodiimide, urea and urethane linkages and starch is incorporated into the polymeric coating.

The invention provides significant advantages from both production and utility points of view. The polymeric coating of this invention forms easily and rapidly at relatively moderate reaction temperatures. Starch is easily incorporated into the coating process and into the coating. Because the coated proppant is free flowing, it handles easily during packaging, transportation and use. Once emplaced within a subterranean formation, the particles pack well and bond well to other particles. Coated proppant particles bonded together in such a manner are resistant to proppant flowback.

Accordingly, the invention is also a method of hydraulically fracturing a subterranean formation, comprising injecting a carrier fluid and coated proppant particles of the invention into the subterranean formation to cause the subterranean formation to form fractures, whereby at least a portion of the coated proppant particles are retained in the fractures.

The substrate particle can be of any material that is solid and thermally stable at a temperature of at least 150° C. Preferably, the substrate particle is heat-stable at a temperature of at least 200° C. and more preferably at least 300° C. By "heat-stable", it is meant that the substrate particle does not melt or otherwise heat-soften to form a flowable material, thermally degrade or decompose, at the stated temperature. Examples of substrate particles include sand and other mineral and/or ceramic materials such as aluminum oxide, silicon dioxide, titanium dioxide, zinc oxide, zirconium dioxide, cerium dioxide, manganese dioxide, iron oxide, calcium oxide, boron nitride, silicone carbide, aluminum carbide, bauxite, aluminum oxide and glass, as well as metals such as metal shot.

The substrate particles may have a particle size such that at least 90 weight-percent of the particles pass through a U.S. 15 mesh screen, which has nominal 4.0 mm openings. In some embodiments, at least 90 weight-% of the substrate particles pass through a U.S. 10 mesh screen, which has nominal 2.0 mm openings, or at least 90 weight-% pass through a 20 mesh screen, which has nominal 1.0 mm openings. In some embodiments least 90 weight-% of the substrate particles preferably are retained on a U.S. 400 mesh screen, a U.S. 200 mesh screen of U. S. mesh 140 screen, which have nominal openings of 0.037 mm, 0.074 mm and 0.105 mm, respectively. Because the coating weights are low, as described below, the coatings are thin and the coated proppants generally have similar particle sizes.

The coating composition includes at least one polyisocyanate. The polyisocyanate preferably has an average functionality from about 1.9 to 4, and more preferably from 2.0 to 3.5. It is preferably a liquid at the application temperature. The average isocyanate equivalent weight can be from about 80 to 500, more preferably from 80 to 200 and still more preferably from 125 to 175. The polyisocyanate can be aromatic, aliphatic and/or cycloaliphatic. Exemplary polyisocyanates include, for example, m-phenylene diisocyanate, 2,4- and/or 2,6-toluene diisocyanate (TDI), the various isomers of diphenylmethanediisocyanate (MDI), hexamethylene-1,6-diisocyanate, tetramethylene-1,4-diisocyanate, cyclohexane-1,4-diisocyanate, hexahydrotoluene diisocyanate, hydrogenated MDI ($H_{12}$ MDI), naphthylene-1,5-diisocyanate, methoxyphenyl-2,4-diisocyanate, 4,4'-biphenylene diisocyanate, 3,3'-dimethoxy-4,4'-biphenyl diisocyanate, 3,3'-dimethyldiphenylmethane-4,4'-diisocyanate, 4,4',4"-triphenylmethane triisocyanate, polymethylene polyphenylisocyanates, hydrogenated polymethylene polyphenylisocyanates, toluene-2,4,6-triisocyanate, and 4,4'-dimethyl diphenylmethane-2,2',5,5'-tetraisocyanate. Preferred polyisocyanates include MDI and derivatives of MDI such as biuret-modified "liquid" MDI products and polymeric MDI. "Polymeric MDI" is a mixture of MDI (any isomer or mixture of isomers) with one or more polymethylene polyphenylisocyanates that have three or more phenylisocyanate groups. The "Polymeric MDI" may have, for example, an isocyanate equivalent weight of 126 to 150 and a number average isocyanate functionality of 2.05 to 3.5, especially 2.2 to 3.2 or 2.2 to 2.8.

A mixture of two or more polyisocyanates may be present in the coating composition.

The coating composition further contains at least one additional ingredient selected from i) an isocyanate trimerization catalyst, ii) a carbodiimide catalyst, iii) an alcohol, iv) a polyamine and v) an alkanolamine. The coating composition may contain any two or more of components i)-v).

An isocyanate trimerization catalyst is a material that promotes the reaction of isocyanate groups with other isocyanate groups to form isocyanurate rings. It preferably is at most a weak urethane and urea-forming catalyst, i.e., has little if any catalytic activity toward the reaction of an isocyanate group with an alcohol, water or a primary or secondary amine group under the conditions of the curing step. It is also preferably at most a weak carbodiimide catalyst, i.e., has little if any catalytic activity toward the reaction of isocyanate groups to form carbodiimides. Useful isocyanate trimerization catalysts include strong bases such as alkali metal phenolates, alkali metal alkoxides, alkali metal carboxylates, quaternary ammonium salts, and the like. Specific examples of such trimerization catalysts include sodium p-nonylphenolate, sodium p-octyl phenolate, sodium p-tert-butyl phenolate, sodium acetate, sodium 2-ethylhexanoate, sodium propionate, sodium butyrate, the potassium analogs of any of the foregoing, trimethyl-2-hydroxypropylammonium carboxylate salts, and the like.

The isocyanate trimerization catalyst may be provided in the form of a dispersion or solution in a carrier. The carrier in some embodiments is a such as ethylene glycol, diethylene glycol, propylene glycol, dipropylene glycol and the like.

Examples of useful commercially available trimerization catalysts include those sold as Dabco® TMR18, Dabco® TMR-30, Dabco® TMR2, Dabco® TMR-7, Dabco® TMR-20 and Dabco® TMR catalysts, from Air Products and Chemicals, Inc.

The isocyanate trimerization catalyst, when present, is present in catalytic quantities, such as from 0.05 to 15 parts by weight per 100 parts by weight of the polyisocyanate. In specific embodiments, this catalyst may be present in an amount of at least 0.1, at least 0.5, at least 1, at least 2.5 or at least 5 parts by weight per 100 parts by weight of the polyisocyanate, and may be present in an amount up to 12.5 or up to 10 parts by weight per 100 parts by weight of the polyisocyanate.

In some other embodiments, the coating composition contains at least one carbodiimide catalyst, i.e., a material that catalyzes the reaction of isocyanate groups to form carbodiimide linkages. Among the useful carbodiimide catalysts are phospholene oxides such as 3-methyl-1-phenyl-2-phospholene oxide (MPPO), 3-methyl-1-ethyl-2-phospholene oxide (MEPO), 3,4-dimethyl-1-phenyl-3-phospholene oxide, 3,4-dimethyl-1-ethyl 3-phospholene oxide, 1-phenyl-2-phospholen-1-oxide, 3-methyl-1-2-phospholen-1-oxide, 1-ethyl-2-phospholen-1-oxide, 3-methyl-1-phenyl-2-phospholen-1-oxide, and 3-phospholene isomers thereof.

The carbodiimide catalyst, when present, is present in catalytic quantities, such as from 0.0001 to 10 parts by weight per 100 parts by weight of the polyisocyanate. In specific embodiments, this catalyst may be present in an amount of at least 0.001, at least 0.01, at least 0.05 or at least 0.1 part by weight per 100 parts by weight of the polyisocyanate, and may be present in an amount up to 5, up to 10, up to 2.5, up to 1 or up to 0.5 parts by weight per 100 parts by weight of the polyisocyanate.

Alcohols that can be present in the coating composition include monoalcohols, and polyalcohols having 2 to 8 hydroxyl groups, in each case different than starch. Such an alcohol may have a hydroxyl equivalent weight of up to 2500 g/equivalent, but the hydroxyl equivalent weight preferably is no greater than 1000, no greater than 500. Each alcohol preferably has a boiling temperature of at least 80° C., more preferably at least 100° C. and a molecular weight of at least 60 g/mol.

Monoalcohols include, for example, alkanols such as any one or more isomers of propanol, butanol, pentanol, hexanol, octanol, decanol, dodecanol, tetradecanol, hexadecanol, octanol, as well as higher alkanols having up to, for example, 60 carbon atoms, especially up to 40 carbon atoms. Other monoalcohols include poly(alkylene glycol) monoethers and poly(alkylene glycol)monoesters such as poly(ethylene glycol) monoethers, poly(ethylene glycol) monoesters), poly(1,2-propylene glycol) monoethers, poly (1,2-propylene glycol) monoesters, monoethers and monoesters of random and/or block copolymers of 1,2-propylene glycol and ethylene glycol; monoethers and monoesters of 1,2- and/or 2,3-butylene oxide; and the like. The ether group may be an alkyl ether group having up to, for example 40 carbon atoms, including methoxy, ethoxy, isopropoxy, n-propoxy, butoxy (any isomer), pentanoxy, hexanoxy, octanoxy, decanoxy, undecanoxy, dodecanoxy, tetradecanoxy, hexadecanoxy, octanoxy and the like. The ether group may be an aromatic ester such as phenoxy or alkyl-substituted phenoxy. The ether group may contain aliphatic carbon-carbon unsaturation as in the case, for example, of a vinyl ether, allyl ether or propenyl ether. The ester group may be, for example, an alkyl ester having up to 40 carbon atoms including formate, acetate, propionate, butanoate, pentanoate, hexanoate, octanoate, decanoate, undecanoate, dodecanoate, tetradecanoate, hexadecanoate and octadecanoate esters. The ester group may contain aliphatic carbon-carbon unsaturation, such as an acrylate, methacrylate or stearate ester. The ester group may be aromatic or substituted aromatic ester.

Polyalcohols may have, for example, 2 to 8 hydroxyl groups per molecule and no primary or secondary amino groups. Examples of polyols include ethylene glycol, diethylene glycol, triethylene glycol, 1,2-propanediol, 1,3-propane diol, dipropylene glycol, tripropylene glycol, 1,4-butane diol, 1,6-hexane diol, 1,8-octane diol, glycerin, trimethylolpropane, trimethylolethane, pentaerythritol, erythritol, sorbitol, mannitol, sucrose, triethanolamine, tri-isopropanolamine and cyclohexanedimethanol. Other polyalcohols include polyether polyols and polyester polyols.

Polyamine compounds are compounds that have two or more primary and/or secondary amino groups. Such an amine compound may have an equivalent weight per primary and/or secondary amino group of up to 2500 g/equivalent, but the equivalent weight preferably is no greater than 1000, no greater than 500. Each polyamine compound preferably has a boiling temperature of at least 80° C., more preferably at least 100° C. and a molecular weight of at least 60 g/mol. The primary and/or secondary amino groups of the polyamine compounds may be bonded directly to aliphatic or aromatic carbon atoms. Examples of polyamine compounds include aliphatic amines such as ethylene diamine, 1,2-propylene diamine, 1,3-propylene diamine, 1,4-butane diamine and 1,6-hexamethylene diamine, other α,ω-alkylene diamines, polyalkylenepolyamines having 3 or more amino groups such as polyethylenepolyamines, aromatic di- and polyamines such as phenylene diamine, toluene diamine and diethyltoluene diamine, and amine-terminated polyethers.

Aminoalcohols have at least one hydroxyl group and at least one primary and/or second amino group. These may have formula weights of, for example, up to 3000, preferably up to 1000 and more preferably up to 500. Among these are, for example, diethanolamine, monoethanolamine, aminoethylethanolamine, diisopropanolamine, monoisopropanolamine, and the like.

The coating composition may further contain one or more urethane and/or urea catalysts, i.e., catalysts for the reaction of an isocyanate group toward an alcohol, water, a primary amino group or a second amino group, particularly when an alcohol, polyamine compound and/or aminoalcohol is present. Among such catalysts are tin (II) and tin (IV) catalysts, catalysts that contain other Group III to Group XV metals; tertiary amine compounds, amidines, tertiary phosphines, and the like. Such catalysts, when present, are present in catalytic quantities, such as from 0.01 to 5 parts by weight per 100 parts by weight of the polyisocyanate. Urethane and/or urea catalysts preferably are absent or if present are present in only small quantities, such as no more than 0.01 part by weight per 100 parts by weight of the polyisocyanate, when the coating composition is devoid of an alcohol different than starch, polyamine compound and an aminoalcohol.

The coating composition may include certain additional optional components.

Water may be present in the coating composition. It is preferred in such a case that the coating composition is devoid of a urethane and/or urea catalyst. Water, if present at all, may be present in an amount of, for example, up to 100 parts by weight per 100 parts by weight of the polyisocyanate and may be present in smaller amounts such as up to 75 or up to 50 parts by weight on the same basis. Although water can react with isocyanates to form ureas, this is believed to be minimized due when a urethane and/or urea catalyst is not present in the coating composition.

Similarly, the coating composition may contain one or more other solvents or diluents, which may be present, for example, as a liquid phase in which the starch, the isocyanate trimerization catalyst or both are dispersed.

The various ingredients of the coating composition can be combined to form a mixture that is applied to the substrate particles. Alternatively, the various ingredients can be applied sequentially to the substrate particles, or in various subcombinations.

The amount of coating composition applied is sufficient to provide 0.1 to 10 parts by weight of the polyisocyanate per 100 parts by weight of the substrate particles. A preferred amount is sufficient to provide 0.1 to 5, 0.1 to 2.5, or 0.1 to 1.5 parts by weight of the polyisocyanate, on the same basis.

The coating composition (or any component thereof) can be applied by spraying or other suitable method. The substrate particles are preferably stirred or otherwise agitated. They may be, for example, disposed in a fluidized bed, in a stirred container or other device that permits the particles to be separated and individually coated.

Curing can be performed at a temperature as low as 0° C., but is preferably performed a temperature of at least 20° C. and more preferably at an elevated temperature of up to 150° C. The elevated temperature preferably is at least 50° C. or at least 60° C. and may be up to 125° C., up to 100° C., up to 90° C. or up to 80° C. An advantage of this invention is that the coating cures rapidly at such moderately elevated temperatures to form free flowing coated proppant particles. The curing time at such temperatures is typically no greater than 10 minutes and may be as short as one minute. A typical curing time may be 1 to 5 minutes or 2 to 5 minutes.

It is generally convenient to heat the substrate particles to the curing temperature before applying the coating composition. The applied coating composition in such cases may be heated to the curing temperature by transfer of heat from the substrate particles, without the need to apply further heating during the curing process.

Agitation should be provided during the curing step to avoid agglomeration.

The substrate particles can be coated in a continuous coating process. In one embodiment of such a continuous coating process, the substrate particles are first washed and then dried at a first predetermined elevated temperature such as, for example, 500° C. to 1500° C. The particles are then cooled to a second, lower predetermined temperature such as 50° C. to 220° C., and fed, preferably without further heating, into an inlet of a combined continuous mixer and conveyor unit. The coating composition is fed into the combined continuous mixer and conveyor unit, where it is mixed with the substrate particles and the coated particles are conveyed through the combined continuous mixer and conveyor unit. The coating composition is cured by transfer of heat from the particles. The coated particles are discharged from an outlet of the combined continuous mixer and conveyor unit. In such a process, the components of the coating composition and the starch may be fed separately into the combined continuous mixer and conveying unit at two or more locations along a travel path of the combined continuous mixer and conveyor unit. Multiple continuous mixers connected in series or parallel can be utilized to achieve the required throughput and curing time. Starch can be added to the substrate particles using loss in weight type feeders.

Starch is present during at least a portion of said curing step. The starch becomes incorporated into the polymeric coating. The starch may be at least partially incorporated into the polymeric coating in the form of particles embedded in an interior and/or on an exterior surface of the solid polymeric coating. Starch has hydroxyl groups, which may react with isocyanate groups to become chemically bonded to the polymeric coating, and so the starch may be incorporated into the polymeric coating in that manner in addition to or instead of forming embedded particles. Embedded particles may become bonded to the polymeric coating through the formation of such chemical bonds.

The starch is a polymeric carbohydrate of glucose units joined by glycosidic bonds, being solid at 23° C. The polymeric carbohydrate molecules may be unbranched or branched. Starch is typically a mixture of amylose, which is a linear and helical polysaccharide made up of α-D-glucose units bonded through α(1→4) glycosidic bonds and no more than one α(1→6) glycosidic bond per 50 glucose units, and amylopectin, which is made up of α-D-glucose units bonded through α(1→4) glycosidic bonds and greater than α(1→6) glycosidic bond per 50 glucose units.

Examples of useful starches are products of one or more plants such as, for example, cereals such as maize, wheat, barley, millet, oats, rye, buckwheat and rice, and root vegetable such as potatoes, sweet potatoes, yams and cassava, as well as other plant sources such as acorns, arrowroot, arrachach, bananas, breadfruit, canna, colcasia, katakuri, kudzu, malange, sago, oca, sorghum, taro, chestnuts and water chestnuts. Corn, wheat, potato, rice and cassava starch are entirely suitable. Modified forms of starch such as pre-gelatinized starch can be used.

The starch may be modified to impart, for example, cationic groups and/or anionic groups, to crosslink the starch, esterify the starch, alkoxylated starch, and/or by adding various additives to the starch. Modified starches having cationic groups may include quaternary ammonium-modified starches. These can be produced, for example, by reacting starch with a quaternary ammonium salt and an alkali as described, for example, in U.S. Pat. Nos. 4,088,600, 5,169,562, and by E. F. Paschall in Chapter 16 ("Production and Uses of Cationic Starches") of *Starch: Chemistry and Technology*, Whistler et al., eds. (1967). Other modified starches include carboxylated starch, which can be prepared by treating starch with an oxidizing agent such as hydrogen peroxide, ammonium persulfate, or sodium hypochlorite under alkaline conditions, and phosphorylated starch, which can be prepared by treating starch with sodium tripolyphosphate (STPP) or sodium trimetaphosphate (STMP). Surface-modified starches of the foregoing types are readily commercially available.

Other modified starches include crosslinked starch produced by reacting starch with a crosslinker such as citric acid, propionic acid, sodium tripolyphosphate, sodium trimetaphosphate, and sodium hypophosphite. Still other starches include those containing an additive such as calcium chloride, potassium iodide, potassium hydroxide, and/or various chloride, carbonate, sulfate, hydroxide, iodide, bromide and thiocyanate salts of alkali metals.

Modified starches have been found to significantly increase the ability of the coated proppant to bind to itself, particularly at lower temperatures such as 40 to 65° C., as measured using the UCS test described below.

In some embodiments, the coating composition includes the starch, i.e., the starch is combined with one or more of the other ingredients of the coating composition and contacted with the substrate together with such other ingredient(s). In such a case, curing takes place in the presence of the starch, which become incorporated into the resulting coating.

In other embodiments, the coating composition is applied to the substrate particles and partially cured before the starch is added. This method has the advantage of simplifying the coating composition and of concentrating the starch near the exposed surface of the cured coating.

In preferred embodiments, at least a portion of the curing step is performed in the presence of at least one adhesion promoter. An adhesion promoter has been found to increase bonding between the coated proppant particles under conditions of elevated temperature and pressure. In particular, the adhesion promoter has been found to increase bonding at lower bonding temperatures such as 40 to 60° C., compared to an otherwise like case in which the adhesion promoter is not present. Examples of suitable adhesion promoters include hydrolysable silane compounds such as aminosilanes (for example, 3-aminopropyl triethoxysilane, 3-aminopropyl trimethoxysilane and/or 3-aminopropyldiethoxymethyl silane and other silanes having a primary or secondary amine group and at least one silane group having at least one hydrolysable substitute) and epoxysilanes (which have at least one epoxy group and at least one silane group having at least only hydrolysable substituent). The adhesion promoter, when present, may be present in an amount of at least 0.5, at least 1, at least 2, at least 4 or at least 6 parts by weight per 100 parts by weight of the polyisocyanate, and, for example, up to 20 parts, up to 15 parts, up to 12 parts or up to 10 parts by weight on the same basis.

It is preferred to apply the adhesion promoter to the substrate particles before the starch is added and before the coating composition has completely cured. It has been found that applying the adhesion promoter after full cure provides little or no benefit and even may lead to a loss of bonding properties. In an especially preferred embodiment, the adhesion promoter is applied after the coating composition is applied to the substrate particles, and before the starch is added, when the coating composition is partially but not fully cured. The starch is subsequently added and curing is then completed after the adhesion promoter has been applied. It has been found that applying the adhesion promote after the coating is partially but not entirely cured leads to a significant increase in the ability of the coated proppant to bind to itself, particularly at lower temperatures such as 40 to 65° C., as measured using the UCS test described below.

When a silane adhesion promoter is present, it is also preferred to perform at least part of the curing step in the presence of a silane curing catalyst, i.e., a catalyst for the reaction of a hydrolysable silane group with water to produce a silanol. Among the useful silane curing catalysts include various acids and bases as described for example, by F. O. Stark et al., Silicones, Comprehensive Organometallic Chemistry, vol. 2, 305, Pergamon Press, 1982 and by W. NOLL, Chemistry and Technology of Silicones, Academic Press, 1968. Metallic catalysts such as tin, lead or gold catalysts are also useful.

Examples of silanol curing catalysts include dibutyltin dilaurate, dimethyltin dilaurate, dibutyltin dioctoate, dimethyltin dioctoate, stannous octoate, stannous oleate, stannic chloride, stannous chloride, di-n-butyl tin bis(mercaptoacetic acid isooctyl ester) and other organotin compounds of the formula $SnR_n(OR)_{4-n}$, wherein R is alkyl or aryl and n is 0-2,1,8-diazabicyclo[5.4.0]undec-7-ene (DBU), 6-(dibutylamino)-1,8-diazabicyclo[5.4.0]undec-7-ene, where the butyl group may be n-butyl, sec-butyl or t-butyl, trimethylamine, triethylamine, dimethylethanolamine, N-methylmorpholine, N-ethylmorpholine, N,N-dimethylbenzylamine, N,N-dimethylethanolamine, N, N, N',N'-tetramethyl-1,4-butanediamine, N, N-dimethylpiperazine, tetramethylguanidine, 1,4-diazobicyclo-2,2,2-octane, bis(dimethylaminoethyl)ether, bis(2-dimethylaminoethyl) ether, morpholine,4,4'-(oxydi-2,1-ethanediyl)bis, triethylenediamine, pentamethyl diethylene triamine, dimethyl cyclohexyl amine, N-cetyl-N,N-dimethyl amine, N-coco-morpholine, N,N-dimethyl aminomethyl N-methyl ethanolamine, N, N, N'-trimethyl-N'-hydroxyethyl bis(aminoethyl) ether, N,N-bis(3-dimethylaminopropyl)N-isopropanolamine, (N,N-dimethyl) amino-ethoxy ethanol, N, N, N', N'-tetramethyl hexane diamine, N,N-dimorpholinodiethyl ether, N-methyl imidazole, dimethyl aminopropyl dipropanolamine, bis(dimethylaminopropyl)amino-2-propanol, tetramethylamino bis (propylamine), (dimethyl(aminoethoxyethyl))((dimethyl amine)ethyl)ether, tris(dimethylamino propyl) amine, dicyclohexyl methyl amine, bis(N,N-dimethyl-3-aminopropyl) amine, 1,2-ethylene piperidine, benzylamine, dibenzylamine, tribenzylamine, butyldodecylamine, and methyl-hydroxyethyl piperazine.

Many silanol catalysts are also catalysts for the isocyanate-water, isocyanate-alcohol and/or isocyanate-amine reaction, and when present, can perform this function as well. Thus, in some embodiments, a single catalyst can functions as both the silanol catalyst and as a catalyst for the reaction of an isocyanate with one or more or water, an alcohol and/or an amine.

The resulting coated proppant particles can be used in the same manner as conventional proppant particles. In a typical hydraulic fracturing operation, a hydraulic fracturing composition, comprising a fracturing fluid, the coated proppant, and optionally various other components is prepared. The fracturing fluid can be a wide variety of fluids such as kerosene and water. Various other components that can be added to the mixture include, but are not limited to, guar and polysaccharides, and well as other components as may be useful.

The fracturing fluid may contain a gelling agent to help prevent the proppant particles from settling prematurely. Such a gelling agent may be dissolved once the formation has been fractured to allow the proppant particles to deposit into the fractures.

The mixture is pumped into the subterranean formation under pressure to create or enlarge fractures in the subterranean formation. Coated proppant particles enter into the fractures and are retained there. When the hydraulic pressure is released, the coated proppant holds the fractures open, thereby maintaining a flow path through the fractures to facilitate the extraction of petroleum fuels or other fluids from the formation to the wellbore.

Another advantage of the invention is that the coated proppant bonds to itself under conditions of elevated temperature and pressure. This property permits the coated proppants to form agglomerated masses within the subterranean fracture. The agglomerated masses are more resistant to proppant flowback than are the individual proppant particles.

The ability of the coated proppant to bond to itself can be measured in accordance with the unconfined compressive strength (UCS) test described in the following examples. When bonded together under conditions of 1000 psi (6.89 MPa) and 70° C. for 16 hours, the compressive strength of the resulting bonded mass, as measured by the USC test, is in preferred embodiments at least 40 kPa. The compressive strength on this test may be at least 70 kPa, at least 100 kPa or at least 125 kPa and may be up to 1000 kPa, up to 500 kPa, up to 400 kPa or up to 300 kPa.

When bonded together under conditions of 1000 psi (6.89 MPa) and 50° C. for 16 hours, the compressive strength of the resulting bonded mass, as measured by the USC test, is in preferred embodiments at least 2 kPa. The compressive strength on this test may be at least 5 kPa, at least 10 kPa, at least 15 kPa, at least 20 kPa, at least 50 kPa or at least 150 kPa and may be up to 500 kPa, up to 400 kPa or up to 300 kPa.

The following examples are provided to illustrate the invention, and are not intended to limit the scope thereof. All parts and percentages are by weight unless otherwise indicated.

The Polyisocyanate is a polymeric MDI product having an isocyanate functionality of 2.7 isocyanate groups per molecule and an isocyanate content of 30.4-32.0%.

Catalyst A is a quaternary amine trimerization catalyst product in a hydroxylic carrier, available commercially from Air Products as Dabco® TMR-18 catalyst.

Catalyst B is a quaternary amine trimerization catalyst product in a hydroxylic carrier, available commercially from Air Products as Dabco® TMR-30 catalyst.

Catalyst C is a dibutyltin dilaurate urethane catalyst product commercially available from Air Products as Dabco® T-12 catalyst.

The Polyol Mix is a 50/50 by weight mixture of glycerin and monoethylene glycol.

The sand used in the following experiments is a 40/70 mesh sand product, except for Example 7, in which the sand is a 100 mesh sand product.

The starch is a cornstarch unless otherwise indicated.

EXAMPLES 1-7 AND COMPARATIVE SAMPLE A

Standard coating procedure for Examples 1-6: 1000 grams of sand is preheated (if necessary) to the coating temperature indicated in Table 1, and loaded into a Hobart type laboratory mixer. The polyisocyanate and catalyst as indicated in Table 1 are separately weighed and added to the preheated sand while the sand is being mixed vigorously. After mixing for 75 seconds, the mixing is halted momentarily and the starch is added. Mixing is then continued until the total mixing time is as indicated in Table 1. The coated sand product thus obtained is discharged into plastic bags and stored at room temperature for several days before being evaluated for unconfined compressive strength (UCS), dry caking evaluation and fines measurement.

Comparative Sample A is made in the same way except no starch is added.

Example 7 is made by heating the sand to the coating temperature indicated in Table 1. The polyisocyanate and catalyst are premixed and added to the heated sand. After mixing for 3 minutes, the mixing is halted momentarily and the starch is added. Mixing is then continued for another 180 seconds. The coated sand product thus obtained is discharged into plastic bags and stored at room temperature for several days before being evaluated for unconfined compressive strength (UCS).

Polyisocyanurate polymer coatings having starch incorporated into them are formed in each of Examples 1-7. A polyisocyanurate coating without starch is formed in Comparative Sample A.

UCS is measured by first sieving the coated sand through 1 mm metal screens. The sieved sand is mixed with a solution of 2% potassium chloride in water, at a weight ratio of 4 parts sand to 3 parts solution. 1 drop of dish soap is added to eliminate air entrainment. The resulting slurry is allowed to stand for 5 minutes, and then loaded into a 1.125 interior diameter steel cylindrical cell with removable top and bottom assemblies. Excess water is drained from the cell. A piston is placed at the top of the sample chamber and hammered into the cell. The top assembly equipped with a pressure relief valve and a nitrogen inlet is attached to the cell. The cell is pressurized to 1000 psi (6.89 MPa) with nitrogen, then kept overnight in a 70° C. oven. The cell is then cooled to room temperature. The sand plug is removed from the cell and dried under ambient conditions for a few days to remove absorbed water. The plug is then broken into 2-inch (5.08 cm) pieces that are filed at the edges to smooth them. Plugs are tested for compressive strength using an MTS insight electromechanical testing system with a 2000 kilonewton load cell and a compression rate of 0.01 inch/minute (0.254 mm/minute). The peak stress value is reported as the USC.

Dry caking is evaluated by placing a coated sand sample in a split cylindrical cell of 2 inches (5.08 cm) in diameter. A weight is applied on top of the sand to generate 6 psi (41.4 kPa) pressure. This setup is placed in an oven at 50° C. for 24 hours. The weight is then removed and the cylindrical cell is split open to visually observe formation of caked clusters.

Fines are measured by loading 100 grams of coated sand into a cylindrical cell with 2-inch (5.08 cm) diameter using a pluviator. The pluviator provides a reproducible method for obtaining consistent and level sample packing in the cell. A cylindrical piston is placed on top of the sand inside the cylindrical cell. This setup is placed in Forney F250 VFD hydraulic frame and a load of 7000 psi (48.3 GPa) is applied at a rate of 33 psi (227.5 kPa)/second and the load is held at 7000 Psi (48.3 GPa) for two minutes. After this, the sample in emptied into a US 70 mesh sieve. The sample is sieved manually and the weight of fines collected in the pan is weighed using a balance and reported as % fines.

sand is preheated to 120° C. and loaded into a Hobart mixer. A heating jacket is used to supply additional heat during the coating process. The catalyst/Polyol Mix mixture and polyisocyanate are separately added to the sand while mixing vigorously. Mixing is stopped after one minute (Ex. 8) or 2.5 minutes (Ex. 9) and the starch is added. Mixing is resumed until a total mixing time as indicated in Table 2 is reached, to produce a coated sand having starch incorporated into the coating. The coated sand product thus obtained is discharged into plastic bags and stored at room temperature for several days before being evaluated for unconfined compressive strength (UCS) measurement.

TABLE 2

| Designation | Ex. 8 | Ex. 9 |
| --- | --- | --- |
| Sand, pbw | 750 | 1000 |
| Polyisocyanate, pbw | 5.3 | 17.5 |
| Catalyst C, pbw | 0.2 | 0.4 |
| Polyol Mix, pbw | 2.2 | 7.3 |
| Cornstarch, pbw | 4 | 5 |
| Temperature, ° C. | 120 | 120 |
| Cycle Time, s | 240 | 210 |
| Sand Quality | FF | FF |
| UCS, psi (kPa) | 25.7 (177) | 53.5 (369) |

These examples show the benefit of incorporating starch into a polyurethane coating. Compared to the control (Comp. Sample A, Table 1), UCS again increases by over an order of magnitude.

TABLE 1

| | Designation | | | | | | | |
| --- | --- | --- | --- | --- | --- | --- | --- | --- |
| | A* | Ex. 1 | Ex. 2 | Ex. 3 | Ex. 4 | Ex. 5 | Ex. 6 | Ex. 7 |
| Sand, pbw | 1000 | 1000 | 1000 | 1000 | 1000 | 1000 | 1000 | 1000 |
| Polyisocyanate, pbw | 9.1 | 9.1 | 9.1 | 9.1 | 9.1 | 9.1 | 9.1 | 9.7 |
| Catalyst A, pbw | 0.9 | 0.9 | 0.9 | 0.9 | 0.9 | 0.9 | 0 | 0.3 |
| Catalyst B, pbw | 0 | 0 | 0 | 0 | 0 | 0 | 0.9 | 0 |
| Cornstarch, pbw | 0 | 4 | 6 | 8 | 4 | 6 | 6 | 6 |
| Temperature, ° C. | 80 | 80 | 80 | 80 | 120 | RT | RT | 120 |
| Cycle Time, s | 180 | 135 | 120 | 120 | 90 | 240 | 240 | 360 |
| Sand Quality | FF | FF | FF | FF | FF | FF | FF | FF |
| UCS, psi (kPa) | 2.3 (15.9) | 33.3 (228) | 42.3 (292) | 42.5 (293) | 31 (214) | 19.7 (136) | 16.7 (115) | 34.6 (239) |
| Dry caking | N.D. | None | None | None | N.D. | N.D. | N.D. | N.D. |
| % Fines | N.D. | 11.5 | 12.0 | 10.5 | N.D. | N.D. | N.D. | N.D. |

Comparative.
"pbw" means parts by weight.
"FF" means "free-flowing".
N.D. is "not done".
"RT" means room temperature, ~20-25° C.

As the data in Table 1 shows, adding the starch during the curing step leads to an order-of-magnitude increase in USC, while producing a product that resists dry caking and has much lower fines compared to uncoated sand, that has 16% fines when tested under same conditions.

When Example 1 is repeated, varying the time at which the cornstarch is added, it is seen that when the cornstarch is added 45 or 60 seconds after the polyisocyanate and catalyst, the UCS values drop into the range of 15 to 18.5 Psi (103.6 to 128 kPa). These results indicate the optimum time for starch addition is after substantial if not complete curing of the coating composition has taken place.

EXAMPLES 8 AND 9

Examples 8 and 9 are prepared by combining the catalyst and Polyol Mix using a high-speed laboratory mixer. The

EXAMPLE 10

A proppant is prepared by applying the coating on sand in a continuous coating process. Three continuous mixers connected in series are used to prepare the coating. Mesh 40/70 sand is heated to a temperature of 87° C., and no additional heating is applied to the sand during the subsequent coating process. The heated sand is loaded into the feed hopper of a Tinker Omega TOM50 high speed continuous sand mixer. For preparing the coating, sand is fed to the mixer at a feed rate of 40-45 lbs./min (18.18-20.45 kg/min). The Polyisocyanate is added to the sand under the feed hopper in the TOM50 mixer at a rate of 0.45 lbs./min (0.2045 kg/min). Catalyst A is added further downstream in the TOM50 mixer at a rate of 0.04 lbs./min (0.01818 kg/min). Sand is mixed vigorously with the coating components inside the mixer. Sand coming out of this mixer is discharged into a Sintoamerica 6S speedflow continuous mixer. Cornstarch is added to the sand while the sand is mixing in this mixer using a Coperion KT20 gravimetric feeder, at a feed rate of 0.2 lbs./min (0.0909 kg/min). Sand coming out of the 6S speedflow mixer is fed to a Sintoamerica 4S speedflow mixer. Sand coming at the outlet of the 4S speedflow mixer has a polyisocyanurate coating into which starch is incorporated. This product is collected in plastic pails for further testing. The coated sand is free flowing. Loss on Ignition (LOI) of this coating is measured according to ISO 13503-2 and found to be 1.61%. The UCS of this sample is measured according to the procedure described in the earlier examples and found to be 32 psi (220.6 kPa). The crush strength of this sample is tested according to ISO 13503-2 and found to be 13000 psi (89.6 MPa), while the uncoated sand has a crush strength of only 10,000 psi (69 MPa). Dry caking is tested according to the procedure described in the earlier examples and no clumps or caked clusters form. This example shows that coating of the invention can be applied in a continuous process while no additional heat is being applied. The coated sand has benefits of improved crush resistance and improved UCS while not showing any dry caking.

EXAMPLES 11-18

Coated proppants are made using the ingredients indicated in Table 3. In each case, starch becomes incorporated into the coating.

Coating procedure for Example 11: 1000 grams of sand is preheated (if necessary) to 80° C., and loaded into a Hobart type laboratory mixer. The polyisocyanate and isocyanate trimerization catalyst as indicated in Table 3 are separately weighed and added to the preheated sand while the sand is being mixed vigorously. After 50 seconds, the mixing is halted momentarily and the starch is added. Mixing is then continued until the total mixing time is as indicated in Table 3. The coated sand product thus obtained is discharged into plastic bags and stored at room temperature for several days before being evaluated for unconfined compressive strength (UCS) and dry caking evaluation. The UCS evaluation is performed in the same manner as in previous examples except the pressured cell is maintained at 50° C., rather than at 70° C. as before.

Example 12 is made the same way as Example 11, except that 3-aminopropyl trimethoxysilane is added 120 seconds after the polyisocyanate and catalysts have been added, at which point the curing reaction is substantially completed. Total mixing time is as indicated in Table 3.

Example 13 is made as follows: 1000 grams of sand is preheated (if necessary) to 80° C., and loaded into a Hobart type laboratory mixer. The polyisocyanate and isocyanate trimerization catalyst as indicated in Table 3 are separately weighed and added to the preheated sand while the sand is being mixed vigorously. After mixing for 10 seconds, 3-aminopropyl triethoxysilane is added. After another 50 seconds, the mixing is halted momentarily and the starch is added. Mixing is then continued until the total mixing time is as indicated in Table 3.

Example 14 is made in the same general manner as Example 13, except dibutyltin dilaurate is mixed with the trimerization catalyst and the catalyst mixture added to the sand at the same time as the polyisocyanate.

Example 15 is made in the same general manner as Example 13, except the 3-aminopropyl triethoxysilane and dibutyltin dilaurate are added together to the sand 10 seconds after the polyisocyanate and trimerization catalyst.

Examples 16 is made in the same general manner as Example 15, except the 3-aminopropyl triethoxysilane is added 50 seconds after the polyisocyanate and trimerization catalyst, and starch is added at 85 seconds. The coating composition is only partially cured at the time of the aminosilane addition.

Examples 17 is made in the same general manner as Example 14, except the 3-aminopropyl triethoxylsilane is added 75 seconds (Ex. 17) after the polyisocyanate and trimerization catalyst, and starch is added 100 seconds after polyisocyanate and trimerization catalyst. The coating composition is only partially cured at the time of the aminosilane addition.

Example 18 is made in the same general manner as Example 17, omitting the dibutyltin dilaurate and substituting 3-aminopropyl trimethoxysilane for the 3-aminopropyl triethoxysilane of Example 17 and adding starch at 100 seconds.

In each case, the coated sand thus obtained is discharged into plastic bags and stored at room temperature for several days before being evaluated for unconfined compressive strength (UCS) and dry caking evaluation. The UCS evaluation is performed in the same manner as in previous examples except the pressurized cell is maintained at 50° C., rather than at 70° C. as before. Results are as indicated in Table 3.

TABLE 3

|  | Example No. | | | | | | | |
| --- | --- | --- | --- | --- | --- | --- | --- | --- |
|  | 11 | 12 | 13 | 14 | 15 | 16 | 17 | 18 |
| Sand, pbw | 1000 | 1000 | 1000 | 1000 | 1000 | 1000 | 1000 | 1000 |
| Polyisocyanate, pbw | 9.1 | 9.1 | 9.1 | 9.1 | 9.1 | 9.1 | 9.5 | 9.5 |
| Catalyst A, pbw | 0.9 | 0.9 | 0.9 | 0.9 | 0.9 | 0.9 | 0.47 | 0.47 |
| 3-aminopropyl triethoxysilane, pbw | 0 | 0.8 | 0.8 | 0.8 | 0.8 | 0.8 | 0.8 | 0 |
| 3-aminopropyl trimethoxysilane | 0 | 0 | 0 | 0 | 0 | 0 | 0 | 0.8 |
| Dibutyltin dilaurate, pbw | 0 | 0 | 0 | 0.09 | 0.13 | 0.5 | 0.045 | 0 |
| Cornstarch, pbw | 4 | 4 | 4 | 4 | 4 | 4 | 5.3 | 5.3 |
| Aminosilane addition time, s | N/A | 120 | 10 | 10 | 10 | 50 | 75 | 75 |
| Cycle Time, s | 150 | 180 | 150 | 150 | 150 | 150 | 150 | 150 |
| Sand Quality | FF | FF | FF | FF | FF | FF | FF | FF |
| UCS, psi (kPa) | <5 (<34.5) | 1.8 (12.4) | 13 (90) | 21.6 (149) | 17.8 (123) | 18.1 (125) | 21 (145) | 22.8 (158) |

TABLE 3-continued

| | Example No. | | | | | | |
|---|---|---|---|---|---|---|---|
| 11 | 12 | 13 | 14 | 15 | 16 | 17 | 18 |

"FF" means "free-flowing".

These examples illustrate the benefit of adding an aminosilane adhesion promoter, and show the effect the timing of its addition has on bonding characteristics at a lower temperature. Example 11 exhibits very good UCS value at 70° C. (34 psi, 235 kPa), but its UCS falls over 80% when the test is repeated at only 50° C. Adding an aminosilane to the coating after the curing is completed (as in Ex. 12), results in an even lower UCS at 50° C.

However, as Examples 13 and 18 show, very large increases in 50° C. USC are obtained by adding the aminosilane when the coating composition has only partially cured. These good results are obtained even in the absence of a silanol catalyst. The 50° C. UCS value for Example 13 is almost three times that of the control and about 7 times greater than that of Example 12, in which the aminosilane is added after curing is completed.

Examples 14-17 in comparison with Example 13 show the benefit of additionally including a silanol catalyst. UCS values increase by 35% to 66% relative to Example 13.

EXAMPLES 19 AND 20

Coated proppants are made using the ingredients indicated in Table 4. In each case, starch is incorporated into the coating.

Examples 19 and 20 are made as follows: 1000 grams of sand is preheated (if necessary) to 80° C., and loaded into a Hobart type laboratory mixer. The polyisocyanate and isocyanate trimerization catalyst as indicated in Table 4 are separately weighed and added to the preheated sand while the sand is being mixed vigorously. After 75 seconds, 3-aminopropyl triethoxysilane is added. After mixing another 45 seconds, the mixing is halted momentarily and a quaternary amine-modified tapioca starch is added. Mixing is then continued until the total mixing time is as indicated in Table 4. The coated sand product thus obtained is discharged into plastic bags and stored at room temperature for several days before being evaluated for unconfined compressive strength (UCS) and sand quality. The UCS evaluation is performed at 50° C., as in Examples 11-18.

As seen from the data in Table 4, the modified starch leads to an order-of-magnitude or more increase in 50° C. UCS, compared to Examples 11-18.

EXAMPLES 21-26 AND COMPARATIVE SAMPLES B AND C

Coated proppants are made using the ingredients indicated in Table 5. In each case starch is incorporated into the coating.

1500 grams of sand are preheated to 80° C. and loaded into a Hobart type laboratory mixer. The polyisocyanate and isocyanate trimerization catalyst as indicated in Table 5 are separately weighed and added to the preheated sand while the sand is being mixed vigorously. 3-aminopropyl trimethoxysilane (when used) is added at a time as indicated in Table 5, the time being calculated from the addition of the polyisocyanate and trimerization catalyst. After 120 seconds, the mixing is halted momentarily and cornstarch (when used) is added, except for example 24 when cornstarch was added at 145 seconds. Mixing is then continued until the total cycle time is as indicated in Table 5 is completed. The coated sand product thus obtained is discharged into plastic bags and stored at room temperature for several days before being evaluated for unconfined compressive strength (UCS) and sand quality. The UCS evaluation is performed at 50° C.

TABLE 4

| Example No. | 19 | 20 |
|---|---|---|
| Sand, pbw | 1000 | 1000 |
| Polyisocyanate, pbw | 9.5 | 9.5 |
| Catalyst A, pbw | 0.47 | 0.47 |
| 3-aminopropyl triethoxysilane, pbw | 0.8 | 0 |
| 3-aminopropyl trimethoxysilane | 0 | 0.8 |
| Dibutyltin dilaurate, pbw | 0.047 | 0 |
| Quaternary amine-modified tapioca starch, pbw | 5.3 | 5.3 |
| Cycle Time, s | 150 | 150 |
| Sand Quality | FF | FF |
| UCS, psi (kPa) | 266 (1837) | 239 (1651) |

"FF" means "free-flowing".

TABLE 5

| Designation | B* | C* | 21 | 22 | 23 | 24 | 25 | 26 |
|---|---|---|---|---|---|---|---|---|
| Sand, pbw | 1500 | 1500 | 1500 | 1500 | 1500 | 1500 | 1500 | 1500 |
| Polyisocyanate, pbw | 14.2 | 14.2 | 14.2 | 14.2 | 14.2 | 14.2 | 14.2 | 14.2 |
| Catalyst A, pbw | 0.8 | 0.8 | 0.8 | 0.8 | 0.8 | 0.8 | 0.8 | 0.8 |
| 3-aminopropyl trimethoxysilane | 0 | 1.2 | 1.2 | 1.2 | 1.2 | 1.2 | 1.2 | 1.2 |
| Aminosilane addition time, s | N/A | 100 | 50 | 75 | 100 | 125 | 100 | 100 |
| Cornstarch, pbw | 0 | 0 | 8 | 8 | 8 | 8 | 4 | 2 |
| Cycle Time, s | 180 | 180 | 180 | 180 | 180 | 180 | 180 | 180 |
| Sand Quality | Not FF | Not FF | FF | FF | FF | FF | FF | FF |
| UCS, psi (kPa) | ND | ND | 19.6 (135) | 27.5 (190) | 41.2 (285) | 42.1 (291) | 31.4 (216) | 28.1 (194) |

*Comparative.
ND is not done.
"FF" means "free-flowing" whereas "Not FF" means the coated sand particles are agglomerated.

Comparative Samples B and C show the results, under these reaction conditions, of omitting starch. The coated sand particles agglomerate in each case, even when the aminosilane adhesion promoter is present (Comp. C). Examples 21 to 24 demonstrate the effect on the timing of the adhesion promoter addition on 50° C. UCS. Under these reaction conditions, the coating composition is partially cured after 50 to 125 seconds. Delaying the addition of the adhesion promoter until later in the cure leads to large increases in 50° C. UCS. Examples 25 and 26 demonstrate that very good results are obtained at lower loadings of cornstarch.

EXAMPLES 27-30

Coated proppants are made using the ingredients indicated in Table 6. In Table 6 and subsequent tables, the "Polyurethane coatings are produced in these examples.

750 grams of sand is preheated to a temperature as indicated in Table 6 and loaded into a Hobart type laboratory mixer. Dibutyltin dilaurate is combined with the Polyol Mix. The polyisocyanate and Polyol Mix/catalyst blend are separately weighed and simultaneously added to the preheated sand while the sand is being mixed vigorously. 3-aminopropyl triethoxysilane is added at a time as indicated in Table 6, the time being calculated from the addition of the polyisocyanate and catalyst. After 195 seconds, the mixing is halted momentarily and cornstarch (when used) is added. At this point, the coating composition has partially but not completely cured. Mixing is then continued until the total cycle time is as indicated in Table 6 is completed. The coated sand product thus obtained is discharged into plastic bags and stored at room temperature for several days before being evaluated for unconfined compressive strength (UCS) and sand quality. The UCS evaluation is performed at 50° C.

TABLE 6

| Example No. | 27 | 28 | 29 | 30 |
|---|---|---|---|---|
| Sand, pbw | 750 | 750 | 750 | 750 |
| Polyisocyanate, pbw | 5.3 | 5.3 | 5.6 | 5.3 |
| Dibutyltin dilaurate, pbw | 0.15 | 0.15 | 0.13 | 0.15 |
| Polyol Mix, pbw | 2.22 | 2.22 | 1.89 | 2.22 |
| Isocyanate index | 100 | 100 | 125 | 100 |
| 3-aminopropyl triethoxysilane | 0 | 0.6 | 0.6 | 0.2 |
| Aminosilane addition time, s | N/A | 85 | 85 | 85 |
| Cornstarch, pbw | 4 | 3 | 4 | 4 |
| Temperature, ° C. | 105 | 105 | 115 | 105 |
| Cycle Time, s | 240 | 240 | 240 | 240 |
| Sand Quality | FF | FF | FF | FF |
| UCS 50° C., psi (kPa) | <5 (<34.5) | 28 (193) | 28.9 (200) | 24.3 (168) |

"FF" is "free-flowing".

Examples 28-30 demonstrate that excellent results are obtainable using a polyurethane coating instead of a polyisocyanurate coating as in previous examples. Starch is incorporated into the coating in all cases. Free-flowing coated sand particles are obtained in all cases. When an adhesion promoter is present (even in a small amount as in Example 30), good UCS values are obtained even at 50° C. In these examples, the dibutyltin dilaurate can function as both a urethane catalyst and a silanol catalyst.

EXAMPLES 31-33

Using the general method described for Examples 27-30, coated proppants are made using the ingredients indicated in Table 7. Starch is incorporated into the coating in each case. Results are as indicated in Table 7.

TABLE 7

| Example No. | 31 | 32 | 33 |
|---|---|---|---|
| Sand, pbw | 750 | 750 | 750 |
| Polyisocyanate, pbw | 7.9 | 10.6 | 13.2 |
| Dibutyltin dilaurate, pbw | 0.22 | 0.3 | 0.37 |
| Polyol Mix, pbw | 3.33 | 4.44 | 5.55 |
| Isocyanate index | 100 | 100 | 100 |
| 3-aminopropyl triethoxysilane | 0.6 | 0.6 | 0.6 |
| Aminosilane addition time, s | 135 | 135 | 135 |
| Cornstarch, pbw | 4.5 | 6 | 7.5 |
| Temperature, ° C. | 105 | 105 | 105 |
| Cycle Time, s | 240 | 240 | 240 |
| Sand Quality | FF | FF | FF |
| UCS 50° C., psi (kPa) | 37.7 (260) | 62.2 (430) | 102.2 (706) |

"FF" is "free-flowing".

These examples demonstrate the effect of increasing coating weight. UCS increases substantially with coating weight while still maintaining a free-flowing proppant product.

EXAMPLES 34 AND 35

Using the general method described for Examples 27-31, coated proppants are made using the ingredients indicated in Table 8. Results are as indicated in Table 8.

TABLE 8

| Example No. | 34 | 35 |
|---|---|---|
| Sand, pbw | 750 | 750 |
| Polyisocyanate pbw | 5.3 | 5.3 |
| Dibutyltin dilaurate, pbw | 0.15 | 0 |
| Dimethyltin dineodecanoate, pbw | 0 | 0.15 |
| Polyol Mix, pbw | 2.22 | 2.22 |
| Isocyanate index | 100 | 100 |
| 3-aminopropyl triethoxysilane | 0 | 0.6 |
| 3-aminopropyldiethoxymethyl silane, pbw | 0.6 | 0 |
| Aminosilane addition time, s | 85 | 85 |
| Cornstarch, pbw | 4 | 4 |
| Temperature, ° C. | 105 | 105 |
| Cycle Time, s | 240 | 240 |
| Sand Quality | FF | FF |
| UCS 50° C., psi (kPa) | 30.4 (210) | 27.8 (192) |

Good results are obtained with a polyurethane coating made using a different catalyst and/or different adhesion promoter.

What is claimed is:

1. A method for forming a coated proppant, comprising applying a coating composition to the surface of solid substrate particles, wherein the solid substrate particles are thermally stable to a temperature of at least 150° C., wherein the coating composition comprises at least one polyisocyanate and at least one additional ingredient selected from i) an isocyanate trimerization catalyst, ii) a carbodiimide catalyst, iii) an alcohol, iv) a polyamine and v) an alkanolamine, and curing the coating composition at a temperature of 50 to 150° C. and for a period of up to 10 minutes on the surface of the substrate particles to form the solid polymeric coating at the surface of the solid substrate particles, wherein the coating composition is applied to the surface of the substrate particles and partially cured, starch is thereafter applied to the coated particles and the curing of the coating composition is completed such that starch becomes incorporated into the solid polymeric coating.

2. The method of claim 1, wherein the starch is modified to have cationic groups and/or anionic groups, to be esterified, to be alkoxylated, and/or to be crosslinked.

3. The method of claim 1 wherein the coating composition is applied to the surface of the substrate particles and partially cured, an adhesion promoter is thereafter applied to the coated particles, starch is applied to the coating particles after the adhesion promoter is applied, and the curing of the coating composition is thereafter completed.

4. The method of claim 3 wherein the adhesion promoter is an aminosilane.

5. The method of claim 1, wherein the coating composition is sprayed onto the substrate particles.

6. The method of claim 1 wherein the coating composition is cured at a temperature of 80 to 150° C.

7. The method of claim 1 wherein the amount of the coating composition applied to the surface of the substrate particles is sufficient to provide 0.1 to 10 parts by weight of polyisocyanate per 100 parts by weight substrate particles.

8. The method of claim 1 wherein the polyisocyanate is a polymeric diphenylmethanediisocyanate and the coating composition comprises at least one isocyanate trimerization catalyst.

9. The method of claim 1 wherein the substrate particles are sand.

* * * * *